United States Patent Office 2,911,383
Patented Nov. 3, 1959

---

2,911,383

METHOD OF MAKING A MODIFIED SULFATE LIGNIN REINFORCED BUTADIENE-ACRYLO-NITRILE RUBBER

Joseph Bayne Doughty, Charleston, S.C., assignor to West Virginia Pulp and Paper Company, New York, N.Y., a corporation of Delaware No Drawing. Application June 27, 1955
Serial No. 518,406

3 Claims. (Cl. 260—17.5)

My present invention relates to reinforced butadiene-acrylonitrile rubber and method of making same.

In recent years it has been found that under certain circumstances lignin will produce a marked reinforcement of rubber, the properties of the rubber so reinforced being comparable with those produced by the reinforcement of rubber with carbon black. One requisite that has thus far been considered necessary, is that the lignin be coprecipitated with the rubber as by first mixing latex of the rubber and a sodium lignate solution, and then effecting coprecipitation by the reduction of the pH of the mixture to the proper value: vide the patent of Arthur Pollak 2,608,537 of August 26, 1952.

Lignin that is incorporated in raw rubber by the ordinary milling process imparts little or no tensile strength to the finished product. I have now discovered however, that upon suitably modifying the lignin, it becomes a reinforcing agent for butadiene-acrylonitrile rubbers merely by incorporation therein by dry milling, thus giving a reinforced rubber of moderate tensile strength and of other desirable properties. In general the lignin so modified is that having a high acetone solubility and other properties. This may be brought about by heating sulfate lignin in caustic alkali solution under regulated conditions, as for example as set forth in my co-pending application, Serial No. 334,739, filed February 2, 1953, now Patent No. 2,802,851. Such modified lignin is also characterized by complete solubility in methyl-ethyl ketone and by giving solutions in caustic alkali of reduced viscosity and by other properties set forth in said pending application.

In addition to its properties of reinforcing butadiene-acrylonitrile rubber, the modified lignin may also be used to advantage as an extender of various resins used in connection with said rubber. The following are the preferred conditions of preparing the modified lignin to be used: A solution is prepared of four parts of sulfate lignin as furnished by West Virginia Pulp and Paper Company under the designation of "Indulin A" in aqueous sodium hydroxide (1.5 parts NaOH in 30 parts water—all parts by weight) which is cooked at 150–170° C. in a suitable pressure vessel for six hours. The modified lignin designated "lignin 1" is thereupon obtained by precipitation upon acidifying the solution to a pH of 2.0 with sulfuric acid. The mixture is then heated to 85–90° C. to coagulate the lignin 1, the mixture filtered and the filter cake washed with water. A typical batch of lignin 1 so recovered analyzed as follows:

| | | |
|---|---|---|
| Moisture | percent | 2.6 |
| Ash | do | 0.85 |
| Sulfur | do | 0.5 |
| Acetone solubility | do | 97 |
| Sintering point | ° C | 193–197 |

The following examples are illustrative:

| Materials used: | Parts by weight |
|---|---|
| Modified lignin | 50 |
| Hycar OR–15 | 100 |
| Hexanediol-2,5 | 5 |
| Zinc oxide | 5 |
| Sulfur | 2 |
| Dibutyl sebacate | 5 |
| Altax (di-2-benzothiazyl disulfide) | 1.5 |
| Cumate (copper dimethyl dithiocarbamate) | 0.3 |

Lignin 1 was admixed with the butadiene-acrylonitrile rubber (Hycar OR–15 as furnished by the B. F. Goodrich Co.) by milling in the following manner: 100 parts by weight of such rubber was softened by milling on cold tight rolls of a roll milling machine until the rolls warmed up to about 100° F. 50 parts lignin 1 was then milled into the rubber which required 7–8 minutes. The plasticizers dibutyl sebacate and hexanediol were added and the whole milled until apparently homogeneous, finally the zinc oxide, sulfur and the accelerators Altax and Cumate were added and the total rubber compound milled for about ten minutes. The compounds were cured at 300–320° F. and the curing time varied from 15 to 60 minutes.

The compounds prepared as above were tested in accordance with the American Society of Testing Materials, Standards on Rubber Products, February 1949.

For sake of comparison, the above examples were repeated using ordinary lignin instead of the modified lignin (lignin 1). The results of all the examples are tabulated as follows:

| Type of Lignin Used | Curing Time, Minutes | Tensile Strength, p.s.i. |
|---|---|---|
| Lignin 1 | 30 | 1,660 |
| Lignin 1 | 30 | 1,680 |
| Lignin (control) | 15 | 650 |
| Lignin (control) | 30 | 800 |
| Lignin (control) | 60 | 580 |

In the following examples a rubber extender was used. Lignin 1 was advantageously used as an extender for the phenol-formaldehyde resin in blends with Hycar OR–15. The procedure was the same as in the preceding examples, except that the resin was first milled into the rubber which took about six minutes at 170° F., and then the lignin 1 was milled in, which took about the same time. The blends contained 200 parts Hycar OR–15, 50 parts Durez (modified phenol formaldehyde resin supplied by Durez Plastics and Chemicals, Inc.), and 50 parts lignin 1 or lignin.

The following show the materials used and the results obtained:

| Materials used: | Parts by weight |
|---|---|
| Hycar OR–15 | 200 |
| Lignin 1 | 50 |
| Resin | 50 |
| Dibutyl sebacate | 10 |
| Zinc oxide | 10 |
| Sulfur | 4 |
| Altax | 3 |
| Cumate | 0.6 |

The products thus made tested as follows:

| Lignin Used | Milling Temperature | Curing Time, minutes | Tensile Strength, p.s.i. |
|---|---|---|---|
| Lignin 1 | 170° F | 15 | 1,880 |
|  |  | 30 | 2,150 |
|  |  | 60 | 2,180 |
| Lignin 1 | cold | 15 | 1,500 |
|  |  | 30 | 1,760 |
|  |  | 60 | 1,700 |
| (Control) Compounded Hycar-Resin mixture, best cure obtained.[1] |  |  | 1,500 |

[1] No lignin present; Hycar 200 parts, resin 100 parts, other ingredients the same.

I claim:

1. A method of reinforcing a rubbery copolymer of butadiene and acrylonitrile which comprises milling together a dry mixture of modified sulfate lignin and said rubbery copolymer, said modified sulfate lignin being at least 90% soluble in acetone and having been prepared by adding aqueous alkali metal hydroxide to sulfate lignin and cooking the sulfate lignin with the alkali metal hydroxide within a temperature range of approximately 150–170° C. for a period sufficient to increase the acetone solubility of said sulfate lignin to at least 90%, acidifying the product of the cook, heating it to coagulate the modified sulfate lignin, and drying the resultant modified sulfate lignin product, the cooking mixture of sulfate lignin and aqueous alkali metal hydroxide containing approximately 4 parts sulfate lignin to 1.5 parts alkali metal hydroxide to 30 parts water.

2. A method as set forth in claim 1, wherein the amount of modified sulfate lignin added to the rubbery copolymer is in the approximate ratio of 50 parts modified sulfate lignin to 100 parts rubbery copolymer.

3. A method as set forth in claim 1, wherein the rubbery copolymer has a phenol formaldehyde resin blended therein.

References Cited in the file of this patent

UNITED STATES PATENTS

| | | |
|---|---|---|
| 2,459,739 | Graten et al. | Jan. 18, 1949 |
| 2,533,632 | Salveson et al. | Dec. 12, 1950 |
| 2,608,537 | Pollak | Aug. 26, 1952 |

UNITED STATES PATENT OFFICE
CERTIFICATE OF CORRECTION

Patent No. 2,911,383                                                                       November 3, 1959

Joseph Bayne Doughty

It is hereby certified that error appears in the printed specification of the above numbered patent requiring correction and that the said Letters Patent should read as corrected below.

Column 1, line 41, for the patent number "2,802,851" read -- 2,802,815 --.

Signed and sealed this 3rd day of May 1960.

(SEAL)
Attest:

KARL H. AXLINE                                              ROBERT C. WATSON
Attesting Officer                                          Commissioner of Patents